United States Patent [19]
Batenburg

[11] 3,842,356
[45] Oct. 15, 1974

[54] PEAK DETECTOR
[75] Inventor: Abram Batenburg, Greensburg, Pa.
[73] Assignee: Westinghouse Electric Corporation, Pittsburgh, Pa.
[22] Filed: Feb. 6, 1973
[21] Appl. No.: 330,162

[52] U.S. Cl. ............................... 328/150, 340/172
[51] Int. Cl. ......................................... H04q 11/00
[58] Field of Search ...... 179/15 A, 15 BL; 340/150, 340/172; 328/150

[56] References Cited
UNITED STATES PATENTS

| | | | |
|---|---|---|---|
| 3,125,750 | 3/1964 | Bussey | 340/150 X |
| 3,168,722 | 2/1965 | Sanders | 340/172 |
| 3,202,968 | 8/1965 | Eady et al. | 340/172 |
| 3,559,178 | 1/1971 | Hibner et al. | 328/150 X |
| 3,619,511 | 11/1971 | Ishikawa | 179/15 BL |

*Primary Examiner*—John S. Heyman
*Attorney, Agent, or Firm*—D. C. Abeles

[57] ABSTRACT

A system for continuously tracking the largest or smallest value attained by one or more rapidly varying signals. The signals are supplied to a multiplex unit clocked to sequentially sample the monitored inputs cyclicly. A multiplex output representative of the sequential samples is then applied to a first highly responsive, high frequency peak finder of a novel construction. The peak finder is responsive to the multiplexed input to provide an output representative of the extreme value attained thereby. The extreme sampled value is stored following the multiplex sampling cycle for an additional period equal to one sample period, at which time the peak finder is reset to follow the next multiplex sampling cycle. A second peak finder, operated in a mode different from the first, is set to its zero state at the beginning of the period following the multiplex sampling cycle and is operable to track the output of the first, during the period the first peak finder output is stored. The second peak finder output is then stored during the following period for display or recording.

6 Claims, 4 Drawing Figures

PEAK DETECTOR

BACKGROUND OF THE INVENTION

This invention pertains in general to peak detector circuits and more particularly to such detector circuits capable of cyclicly monitoring the extremum attained by one or more rapidly varying signals.

It is often desirable to determine the maximum value of variable attains in a certain time interval. This problem can arise in a wide range of engineering fields. For example, in a rocket, operating under widely varying conditions, it is necessary to measure the maximum acceleration that a given booster can furnish. This maximum acceleration is a complicated function of the fuel control philosophy, the design of the rocket, the trajectory followed, etc. It is therefore imperative to measure this maximal acceleration in order to perform the stress analysis required, not only for the rocket shell but also for the instruments employed. Furthermore, the steady state operating point of many systems is limited because of transient conditions. The extreme value of the most severe peaks during a transient response determine how far the steady state operating point of the process has to be away from the ultimate limiting constraint boundary. This affect can be noticed in such systems as nuclear reactor plants, fossil fired power plants, chemical catalytic cracking units, etc. Additionally, the safety factors used in the designs of many systems, such as bridges and pressure vessels, are also based upon a maximum value, such as stress, attaining during transients.

Very often the design engineer is unable to predict accurately what a limiting peak value will be. The reason for this is that the processes involved are extremely complicated and highly non-linear. In order to prevent overly conservative design, analog computers are used to study the process before hand. The results of this analysis are later checked by actually measuring the response of the process, once it is in operation.

For this purpose it is highly desirable to have a device available that automatically measures and retains the highest peak of a variable during a transient. At the moment such devices are readily available for low frequency operation. However, because of the equipment employed, these units are not applicable to high and midfrequency signals typical of modern computer studies.

This problem becomes even more complicated when it becomes necessary to monitor the extremum of a multiplicity of signals as is the control philosophy emerging for liquid metal fast breeder reactor plants as well as for the fast flux test facility. The control of these plants require auctioneering of the highest value among several comparable measurements. An example is the rod control system, which, according to present design, will keep the exit temperature of the hottest subassembly within the reactive region of the reactor at a predetermined value. This requires instrumentation to continuously scan a multiple of thermocouples to determine and retain the highest value.

Furthermore, this has to be done on a continuous basis, since changing operating conditions can lead to a spatial shift in power generation which could further lead to another thermocouple attaining the highest temperature value.

A second area of application is in the presentation of relevant information to the plant operator. One major area of concern is the operating margin that exists before it becomes necessary to scram the control mechanisms to shutdown a powerplant under emergency conditions. Even the tripping of one channel will result in a partial scram, which requires operator attention and intervention. Furthermore, it could easily lead to plant scram if the tripping of one additional channel occurs in the same protection function. It is, therefore, advantageous to present to the plant operator the smallest margin to trip out of all the protection channels. All protection information is, of course, displayed. However, because of the volume of information available, it is advisable to concentrate the data into the most meaningful form to enable the operator to take action to prevent total and partial scrams.

Therefore, apparatus is desired to determine the extreme value obtained by one or more rapidly varying signals and to prevent this information in a meaningful form.

SUMMARY OF THE INVENTION

Briefly, this invention provides a system for continuously tracking the extreme value attained by one or more rapidly varying signals. The inputs to be monitored are sequentially presented to a first peak finder which is responsive to provide an output representative of the largest input received. After each of the inputs are sequentially sampled at the peak finder input the output is stored for a predetermined time period and then reset to the zero state. During the storage period this information is communicated to a second peak finder which tracks the output of the first during its storage period and stores the information thus obtained for display or recording until the first peak finder output is again stored in the following cycle. The second peak finder resumes its zero state just prior to the cyclic storage of the first peak finder so as to enable the output of the second to assume the updated information.

Thus, the output display can be made commensurate with both the maximum rate of change of the input signals and the reaction time of a human observer or response time of an electromechanical or electronic recorder.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

The problems of the prior art can eminently be resolved by the apparatus contemplated by this invention. One of the desirable characteristics of the exemplary embodiment provided thereafter is that it can be constructed with state of the art hardware. Furthermore, the circuit to be described exhibits immense flexibility in that the number of input channels, as well as the scan frequency employed, can easily be adjusted to meet varying operating conditions. The unit constitutes an economical way to reduce a large number of varying signals into the extreme value exhibited by these signals. Moreover, this extremum signal is provided in a form perfectly suited for low frequency recording devices and comprehension by operating personnel.

Figure 1:
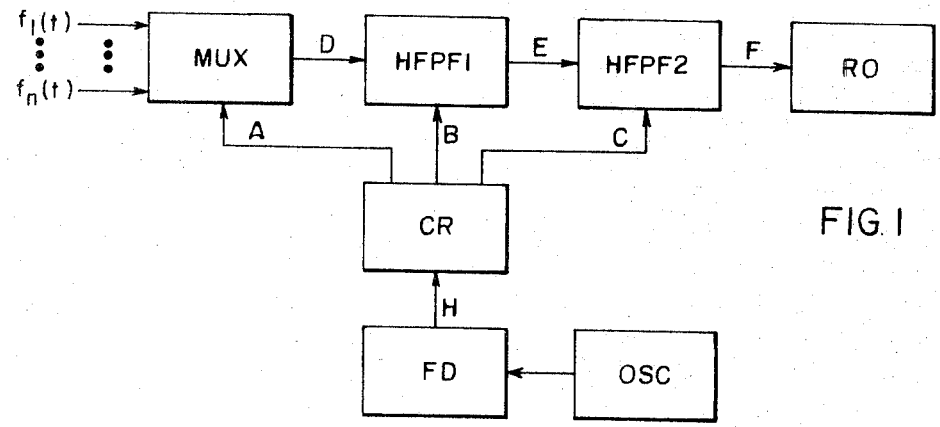
FIG. 1 is a block diagram illustrative of the individual components of one exemplary embodiment of this invention.
Figure 2:
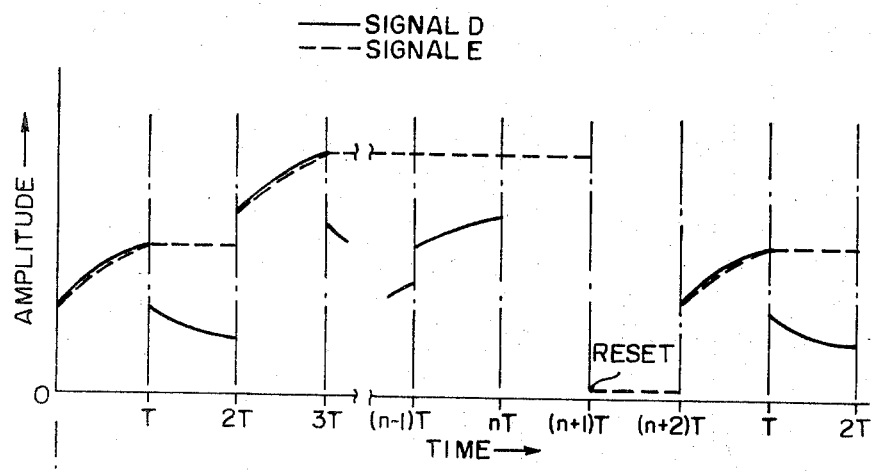
FIG. 2 is a graphical illustration of the various signals provided by the components illustrated in FIG. 1.
Figure 2:
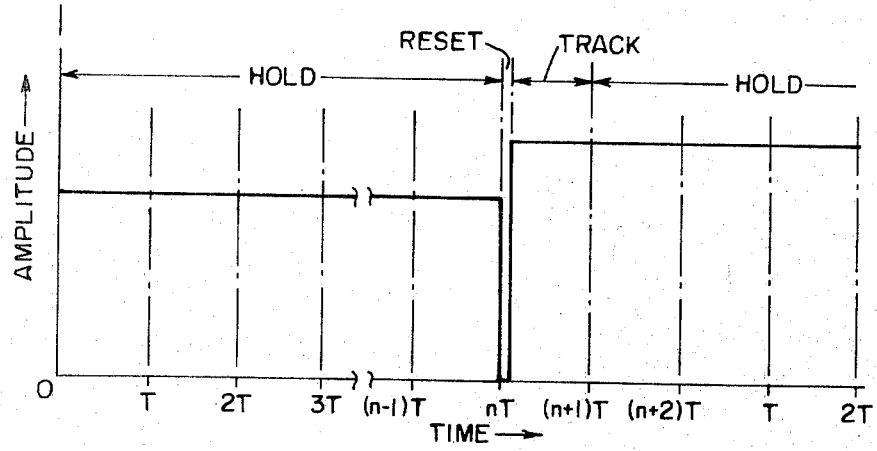

A schematic diagram of the hardware configuration contemplated by this exemplary embodiment is illustrated in block form in FIG. 1. The incoming signals to be monitored, illustratively shown by reference characters $f_1(t) - f_n(t)$, are sequentially connected, for a small period T, to a high frequency peak finder HFPF1 (described in more detail hereinafter), via multiplex MUX, having an output D. The multiplexer is controlled by a (cycler and reset) unit CR, which issues the control pulses A to direct the stepping rate of the multiplexer. The (cycler and reset) unit CR, is illustrated as operating from a crystal-controlled oscillator OSC, via a frequency divider such as the preroded counter FD. The resulting waveform output D of the multiplexer is shown in graphical form in FIG. 2. The high frequency peak finder HFPF1, receives signal D as an input and yields as an output the function E, which is also shown graphically in FIG. 2. This function acts as an input for a second high frequency peak finder HFPF2. After the multiplexer MUX, has cycled through all of the inputs, $f_1(t) - f_n(t)$, which takes a total of nT, the high frequency peak finder (HFPF1, is put in the storage mode, maintaining its output for a duration T. The unit HFPF1 is reset during the next period T. After this total elapsed time of $(n + 2)T$ the original cycle is repeated by connecting small $f_1(t)$ via multiplexer MUX, to the input of unit HFPF1.

The second high frequency peak finder HFPF2 is operated in a different mode than unit HFPF1. At the beginning of the period from nT till $(n + 1)T$ this unit is reset to zero and next allowed to track the signal E from HFPF1. For the rest of the cycle of $(n + 2)T$ this unit is switched to a storage mode by the corresponding control signal C from the "cycler and reset" unit CR. The output of HFPF2, F will in this manner exhibit the largest value of the incoming signals, $f_1(t) - f_n(t)$, with an average time delay of $((n + 1)/2)T$. The output of HFPF2 is then in a form which can be presented to a display readout unit such as the one designated RO.

Thus, it can be seen that one of the very attractive features of this invention is that the frequency response of this device can be much less than would normally be required to determine the maximum value of the signals $f_1(t) - f_n(t)$.

For the unit described to be of practical use, it is desirable that the total cycle $(n + 2)T$ be small enough to insure that $f_1(t) - f_n(t)$ do not vary significantly during this period. This can be easily accomplished with present state of the art equipment. For example, operating the equipment at a basic frequency of 1 kilohertz is very straightforward. This allows rescanning of the incoming variables every $(n + 2)$ milliseconds. For the number of channels contemplated for the liquid metal fast breeder reactor and fast flux test facility (less than 50), this allows display at a rate commensurate with both the maximum rate of change of plant variables and within the reaction time of the human operator.

Figure 3:
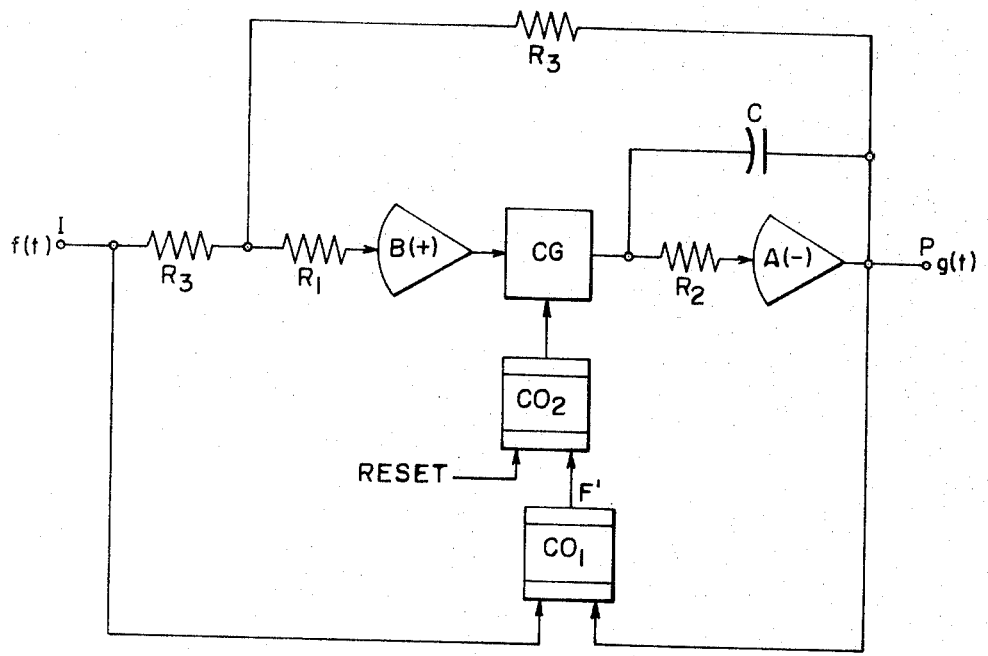
FIG. 3 is a schematic diagram illustrative of the high frequency peak finders illustrated in FIG. 1.

A novel arrangement for the high frequency peak finder previously referred to is illustrated in FIG. 3. The sequence of input signals previously referred to as the multiplexer output D is indicated at the input to the circuit, I, by $f(t)$. The combination formed by the high gain amplifier a (with sign inversion), the input resistor $R_2$, the feedback capacitor C, the high gain amplifier B (without sign inversion), and the resistors $R_1$ and $R_3$ is a first order lag unit. The circuitry characteristics of the combination yields a relationship between the inputs signals given by $$f(t) = -9(t) - \tau(dg(t))/dt$$

for $R_1$ equal to $R_3$.

In Laplace transform notation this becomes $$G(s)/F(s) = -1/(1 + \tau s)$$

Because of the high gain amplifier B (without sign inversion), this time constant is extremely small and consequently the output lags very little behind the input. Time constants in the order of microseconds can easily be obtained with present day technology.

When the feedback circuit, including the capacitor C is suddenly opened by the electronic switch CG, the charge on the capacitor C is retained and thus the value of $g(t)$ at that moment is maintained at the output P. Because of the very small value of the time constant of the first order lag, this value of $g(t)$ is very close to the corresponding value of minus $f(t)$. Accordingly, the proper command of the switch CG will enable the storage of the desired value of $g(t)$.

In order to simplify the explanation of the circuit, it will for the moment be assumed that $f(t)$ is positive at all times during the analysis. It should be realized, however, that this is not a prerequisite for satisfactory operation of the high frequency peak finder. As long as $f(t)$ increases, the absolute value of $g(t)$ will be slightly smaller than the value of $f(t)$. At this point it should be realized that there is a sign inversion between $f(t)$ and $g(t)$, therefore, the algebraic sum of $f(t)$ and $g(t)$ will be positive. However, once $f(t)$ passes its peak and starts to decrease, the rolls are reversed. Since now the absolute value of $g(t)$ is slightly larger than the value of $f(t)$; the algebraic sum of $f(t)$ and $g(t)$ will be negative. Use is made of a very sensitive polarity detector $CO_1$, which generates a signal F', when the sum of $f(t)$ and $g(t)$ becomes negative, to open the feedback circuit in the first order lag unit, via the electronic switch CG. Consequently, the value of $g(t)$ at that time is retained on the capacitor C. When the input $f(t)$ assumes a value larger than the previous peak, the electronic switch CG closes the feedback circuit containing the capacitor C, in response to the output of the polarity detector $CO_1$. At this point $g(t)$ follows the inverse of $f(t)$ until the next peak appears, which is consequently retained. The two resistors, R3, provided in the feedback loop between P and the input to R1 are supplied to accomplish the summation of $f(t)$ and $g(t)$. It follows from the description given that this process is independent of the sign of $f(t)$; at all times will the largest value be stored on the capacitor C.

In order to reset the first order lag unit once the signal $f(t)$ has completed its cycle, use is made of a second polarity detector $CO_2$ and a reset signal RESET.

Figure 4:
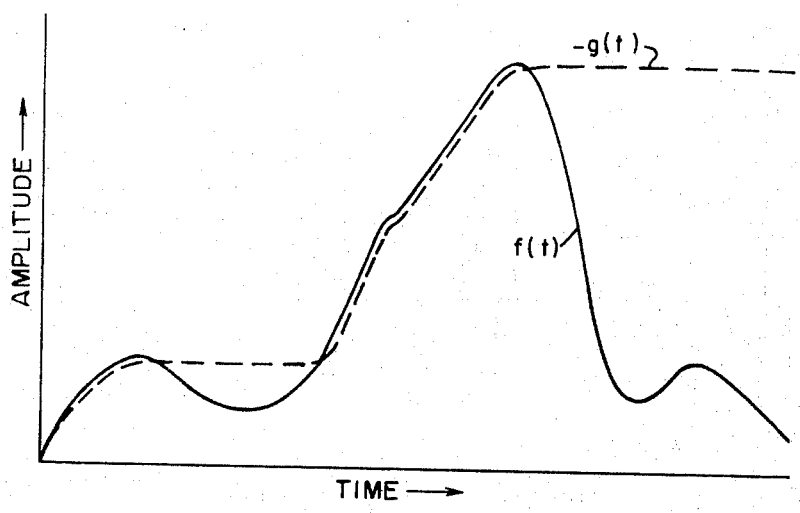
FIG. 4 is a graphical illustration of the input and output signals respectively provided to and by the circuit illustrated in FIG. 3.

Because of the small time in of the first order lag unit (values of a few microseconds are easily available) and the short switching time of CG and the polarity detectors $CO_1$ and $CO_2$ (approximately 20 microseconds or less), this circuit is applicable to signals having high frequency components. Also, the polarity detectors can easily be made accurate to within 5 millivolts, which assures a high accuracy n the comparison of $f(t)$ and $g(t)$. A graphical illustration of the correspondence between the input $f(t)$ and the output $g(t)$ is illustrated in FIG. 4.

Thus, it can be seen that the functions provided by the high frequency peak finders 1 and 2, illustrated in FIG. 1, can be provided by the circuit just described having the appropriate control signals generated by the "cycle and reset" unit to the respective polarity detectors $CO_1$, to put the units in storage (or hold) mode, and $CO_2$ to reset the respective units. These signals are illustratively shown in FIG. 1 by reference characters B and C.

Accordingly, the instrumentation contemplated by this invention will continuously track the extreme value attained by one or more rapidly varying signals such as are required in liquid metal fast breeder applications, and present this information in a more meaningful form to a human observer or data recorder, by reducing the number of variables to be monitored to their extremum value.

I claim as my invention:

1. A peak detector for determining the extreme value attained by one or more rapidly varying monitored input signals comprising:

a multiplex unit operable to sequentially sample the monitored inputs cyclicly and provide an output sequentially representative thereof;

a first order lag unit having an input from said multiplex unit output and responsive thereto to provide an output which tracks the extremum of said lag unit input, said lag unit including a first feedback loop operable to follow and maintain the output value thereof until said multiplex output exceeds said lag unit output and a second feedback loop operable to communicate said lag unit output to said multiplex output and subtract the same therefrom before being applied to the input side of said lag unit; and means responsive to the polarity of the difference of the input signal to said lag unit and said lag unit output to disconnect the input from communication to said first feedback loop and said lag unit output when a predetermined polarity is exhibited by the difference, and communicate the same when an opposite polarity to the predetermined polarity is exhibited by the difference, said first feedback loop being operable upon disconnection to maintain said lag unit output at the value last exhibited.

2. The peak detector of claim 1 wherein said lag unit exhibits a substantially small time constant so that the lag unit output value substantially follows the corresponding input signal peak value in time.

3. The peak detector of claim 1 wherein said polarity responsive means comprises:

a polarity detector operable to compare the input and said lag unit output and responsive to the polarity of a difference exhibited thereby to communicate an output signal; and a switch responsive to the output signal generated by said polarity detector to disconnect the resultant input from, and in the absence of said polarity detector output communicate the same to, said first feedback loop and said lag unit output.

4. The peak detector of claim 1 including means for resetting said lag unit output to a zero state so as to prepare the peak detector to track a new extremum.

5. The peak detector of claim 1 wherein said first order lag unit includes a series arrangement comprising a first high gain amplifier without sign inversion having an input from said multiplex output and a second high gain amplifier with sign inversion having an input from the output of said first amplifier and an output which forms said lag unit output and wherein said first feedback loop comprises a capacitor in parallel with the input and output of said second amplifier and said second feedback loop includes a resistor in parallel with the corresponding input and output of said first and second amplifiers, respectively.

6. The peak detector of claim 1 including:

a second first order lag unit having an input from said lag unit output and responsive thereto to provide an output which tracks the extremum of said lag unit output; and means for cycling said multiplex unit, said lag unit and said second lag unit, said cycling means being operable to cyclicly control said multiplex unit to sequentially sample each of the inputs monitored for a predetermined sample time period T, so as to step the multiplex unit to sample each of the inputs monitored in a total cycle period of $nT$, where $n$ is an integer correspondng to the number of inputs monitored, and to energize said polarity responsive means to disconnect the resultant input after the total cycle period $nT$ so that said first feedback loop maintains said lag unit output last exhibited for a duration T and reset said lag unit to a zero output state during the next time period T so as to prepare the lag unit to track a new extremum, said cycling means is further cyclicly operable to control said second lag unit to set it to the zero output state at the beginning of the period extending from $nT$ to $(n+1)T$ and store the extremum value monitored during this period on said second lag unit output, so that one total cycle period of the peak detector is $(n+2)T$ after which the same sequence is repeated.

* * * * *